United States Patent
Jeuk et al.

(10) Patent No.: US 10,715,432 B2
(45) Date of Patent: Jul. 14, 2020

(54) CHAINED COLLECTION OF INFORMATION

(71) Applicant: Cisco Technology, Inc., San Jose, CA (US)

(72) Inventors: Sebastian Jeuk, San Jose, CA (US);
Ralf Rantzau, San Jose, CA (US);
Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 87 days.

(21) Appl. No.: 15/937,888

(22) Filed: Mar. 28, 2018

(65) Prior Publication Data

US 2019/0306056 A1 Oct. 3, 2019

(51) Int. Cl.
*G06F 15/173* (2006.01)
*H04L 12/741* (2013.01)
*H04L 29/06* (2006.01)

(52) U.S. Cl.
CPC .............. *H04L 45/74* (2013.01); *H04L 69/18* (2013.01); *H04L 69/22* (2013.01)

(58) Field of Classification Search
CPC ................................ H04L 45/74; H04L 69/22
USPC ....................................................... 709/238
See application file for complete search history.

(56) References Cited

U.S. PATENT DOCUMENTS

| 2011/0285516 A1* | 11/2011 | Ritter | ............... | H04W 88/04 |
| | | | | 340/286.02 |
| 2015/0071285 A1* | 3/2015 | Kumar | ................ | H04L 45/306 |
| | | | | 370/392 |

FOREIGN PATENT DOCUMENTS

| CN | 102595546 | | 9/2014 | |
| EP | 629098 | | 12/1994 | |
| FR | 2761842 | | 10/1998 | |
| GB | 2424463 | | 9/2006 | |
| GB | 2424483 | A * | 9/2006 | ............ G01D 21/00 |
| KR | 2010021768 | | 2/2010 | |

OTHER PUBLICATIONS

IPv6 Segment Routing Header (SRH) draft-ietf-6man-segment-routing-header-00 (Year: 2017).*
Service Function Chaining (SFC) ArchitectureRFC 7665 (Year: 2015).*
Data Fields for In-situ OAM draft-ietf-ippm-ioam-data-00 (Year: 2017).*

(Continued)

*Primary Examiner* — Hee Soo Kim
(74) *Attorney, Agent, or Firm* — Behmke Innovation Group LLC; James M. Behmke; Jonathon P. Western

(57) ABSTRACT

In one embodiment, a device is described, the device comprising a processor, a memory operative to store data used by the processor, a network interface operative to enable network communications with at least one other device, and a client executed by the processor, the client operative to utilize a first networking protocol to chain a request for information from the at least one other device and to send an information request packet via the network interface to the at least one other device, the information request packet comprising a request for information from the at least one other device, and a header of a second network protocol, in which a response to the request for information may be provided. Related devices, systems, and methods are also described.

20 Claims, 3 Drawing Sheets

(56) References Cited

OTHER PUBLICATIONS

NSH Encapsulation for In-situ OAM Data draft-brockners-sfc-ioam-nsh-00 (Year: 2017).*
Lim, Se-Jung et al.: "Energy-efficient chain formation algorithm for data gathering in wireless sensor networks": in International Journal of Distributed Sensor Networks vol. 2012, Article ID 843413, 9 pages.
Lidsey, S., et al.; "PEGASIS: Power-efficient gathering in sensor information systems"; on Proceedings, IEEE Aerospace Conference, 2002, pp. 3-1125-3-1130 vol. 3.
Rajagopalan, Ramesh et al.; "Data aggregation techniques in sensor networks: A survey" (2006), Electrical Engineering and Computer Science. Paper 22.
Brockners, F., et al.; "VXLAN-GPE Encapsulation for in-situ OAM Data; draft-brockners-ioam-vxlan-gpe-22; 30" Oct. 2017.
Previdi, S., et al.; "IPv6 Segment Routing Header (SRH); draft-ietf-6man-segment-routing-header-02"; Sep. 20, 2016.

* cited by examiner

CHAINED COLLECTION OF INFORMATION

TECHNICAL FIELD

The present disclosure generally relates to chained network communications among devices.

BACKGROUND

Segment Routing leverages a networking source routing paradigm. An ingress node steers a packet through an ordered list of instructions, called segments. Instructions of the ordered list of instructions represent functions to be called at a specific location in the network. A function is locally defined on the node where it is executed and may range from simply moving forward in the segment list to any complex user-defined behavior. Network programming consists of combining segment routing functions, both simple and complex, to achieve a networking objective that goes beyond mere packet routing.

"In-situ" Operations, Administration, and Maintenance (OAM) refers to the concept of directly encoding telemetry information within the data packet as the packets traverse the network or telemetry domain. Mechanisms which add tracing or other types of telemetry information to the regular data traffic, sometimes also referred to as "in-band" OAM, can complement active, probe-based mechanisms such as ping or traceroute, which are sometimes considered as "out-of-band" because the messages are transported independently from regular data traffic. In relation to "active" or "passive" OAM, "in-situ" OAM can be considered a hybrid OAM type. While no extra packets are sent, in-situ OAM (iOAM) adds information to the packets and therefore cannot be considered passive.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a device is described, the device comprising a processor, a memory operative to store data used by the processor, a network interface operative to enable network communications with at least one other device, and a client executed by the processor, the client operative to utilize a first networking protocol to chain a request for information from the at least one other device and to send an information request packet via the network interface to the at least one other device, the information request packet comprising a request for information from the at least one other device, and a header of a second network protocol, in which a response to the request for information may be provided. Related devices, systems, and methods are also described.

Example Embodiments

Figure 1:
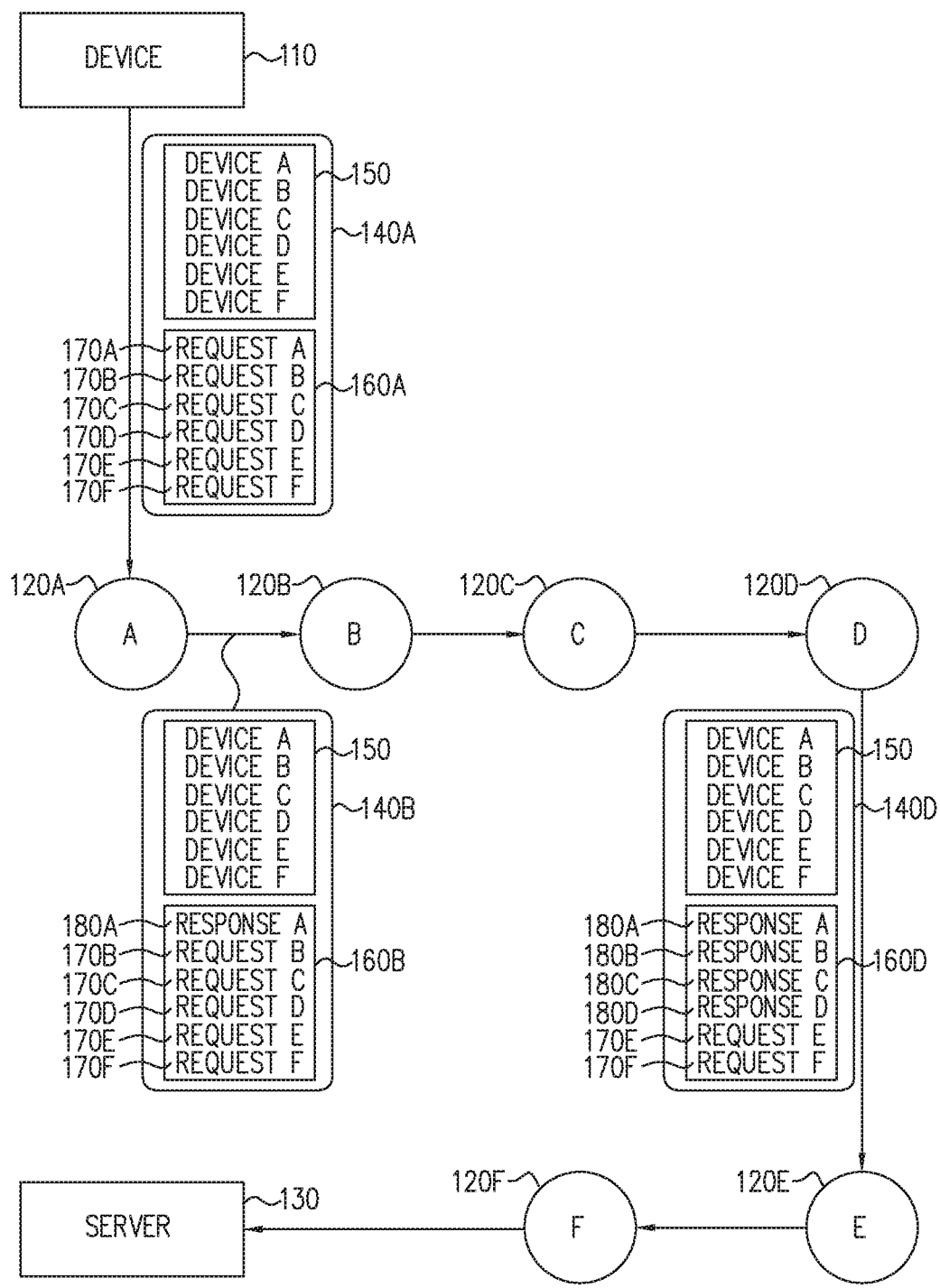
FIG. 1 is a simplified block diagram illustration of a network of devices communicating in accordance with an embodiment of the present disclosure.

Reference is now made to FIG. 1, which is a simplified block diagram illustration of a network of devices communicating in accordance with an embodiment of the present disclosure.

There is often a desire for communication among a large number of devices. Often such requests are made on a device-to-device basis, with the initiating device sending large numbers of requests for information to a large number of recipient devices. Such communication might be performed on a multicast basis, for example. Even in such a case, responses are sent, either to a requesting device, such as requesting device 110, or to a recipient device, such as a server, for example, server 130, on an individual basis by the recipient devices.

The requesting device 110 may send a multicast (or individual) request for information to recipient devices 120A-120F (depicted as devices A-F). At least one of the recipient devices 120A-120F may send a reply to the request for information (including the requested information), to the requesting device 110. The requesting device 110 may then forward the responses (either as one information packet or on an individual basis) to the server 130. Note that the embodiment described in this paragraph is not explicitly depicted in FIG. 1.

By way of a specific example, the recipient devices 120A-120F might be temperature sensors to which a query has been sent, requesting that the device return its detected temperature. The query might have been initiated at the requesting device 110. However, it might be the case that the replies are to be reported to a remote server, such as server 130, and thus the replies arrive at the server 130 as their final destination.

In an environment where devices, such as the requesting device 110 and the recipient devices 120A-120F, support and are compliant with in-situ Operations, Administration, and Maintenance (iOAM) protocol, iOAM may be used to collect data and information about and from the recipient devices 120A-120F. The request for information may be chained using a metadata enabled protocol such as network services header (NSH) or a segment routing (SR) protocol, in particular an Internet Protocol version 6 (IPv6) compliant SR protocol, such as SR version 6 (SRv6). Persons of skill in the art will appreciate that using NSH or SRv6 to perform the chaining of the requests enables collecting the requested data and information in a specific order, if that is desirable for particular applications.

The device 110 prepares a packet 140A comprising, for example, a SRv6 segment list 150. The SRv6 segment list 150 of the packet 140A is depicted with a list reading: Device A, Device B, . . . , Device F. This indicates that the SRv6 environment is to route the packet 140A first to device 120A, then to second device 120B, and so forth, to sixth device 120F.

An iOAM header 160A is added to the packet 140A. The iOAM header 160A contains requests for information 170A-170F addressed to the recipient devices 120A-120F.

As the packet 140A arrives at one of the recipient devices 120A-120F, say, first device 120A, a request for information 170A addressed to the specific device 120A is processed by the device 120A. A response from the addressed device 120A, which may take a form such as {Sensor-ID: Information}, and depicted in FIG. 1 as Response A 180A, is added by the device 120A to iOAM header 160B in packet 140B (since the iOAM header and the packet have been updated, it is now identified differently than previously). The packet continues its path as provided in the SRv6 segment list 150. Accordingly, after the packet (now 140D) has been forwarded by device D 120D, the iOAM header (now 160D) is now depicted with responses 180A-D, from devices 120A-D, and requests 170E-F, addressed to devices 120E-120F. It is appreciated that the order of the responses is the order provided by the iOAM header 160A, 160B, 160D, namely, the order provided by the requesting device 110. Furthermore, if for some reason, one of the recipient devices 120A-120F is unable to reply, e.g., a device failure of some sort, then an absence of a response will be apparent at the server 130 when the packet 140 is received at the server 130. It is appreciated the information may be modified or used as needed by one of the recipient devices 120A-120F.

Finally, as described above, the packet arrives at the server 130. It is appreciated that in some embodiments, the server 130 and the requesting device 110 might, in practice, be the same device, or part of a single destination entity. It is appreciated that server 130 may not be a server, but rather some destination device.

In one embodiment, the devices 120A-120F may be sensors, and the server 130 desires sensor information from other sensors in a specific or a particular order. In such a case, as mentioned above, the server 130 may initiate the request to collect the sensor information. Alternatively, a consumer may be sending information across multiple sensors. In such a case, the devices 120A-120F (i.e. sensors) in the order (i.e., chain) might utilize the information collected from previously visited sensors within the chain.

In another embodiment, the devices 120A-120F may be sensors in a manufacturing plant or a smart city. Here, specific sensors are typically addressed in a specific order to collect relevant information. By way of example, in an assembly line, sensor information may be collected from the beginning of the assembly line (the initial state of the product) through to the final product.

In still another embodiment, sensor clusters may collect information from within their respective sensor cluster, and then, a resulting single packet from a first sensor cluster may be iteratively joined to a second resulting single packet from a second sensor cluster. For example, two neighboring buildings in a single campus might each be one sensor cluster of the two sensor clusters. Information resulting from queries of the two buildings might be joined together in a single packet for forwarding to a receiving device, such as server 130. Alternatively, in a jet airplane, groups of sensors in each jet engine might be called on to provide information which is then grouped together in a single packet which comprises information about the jet engines in the jet airplane.

Figure 2:
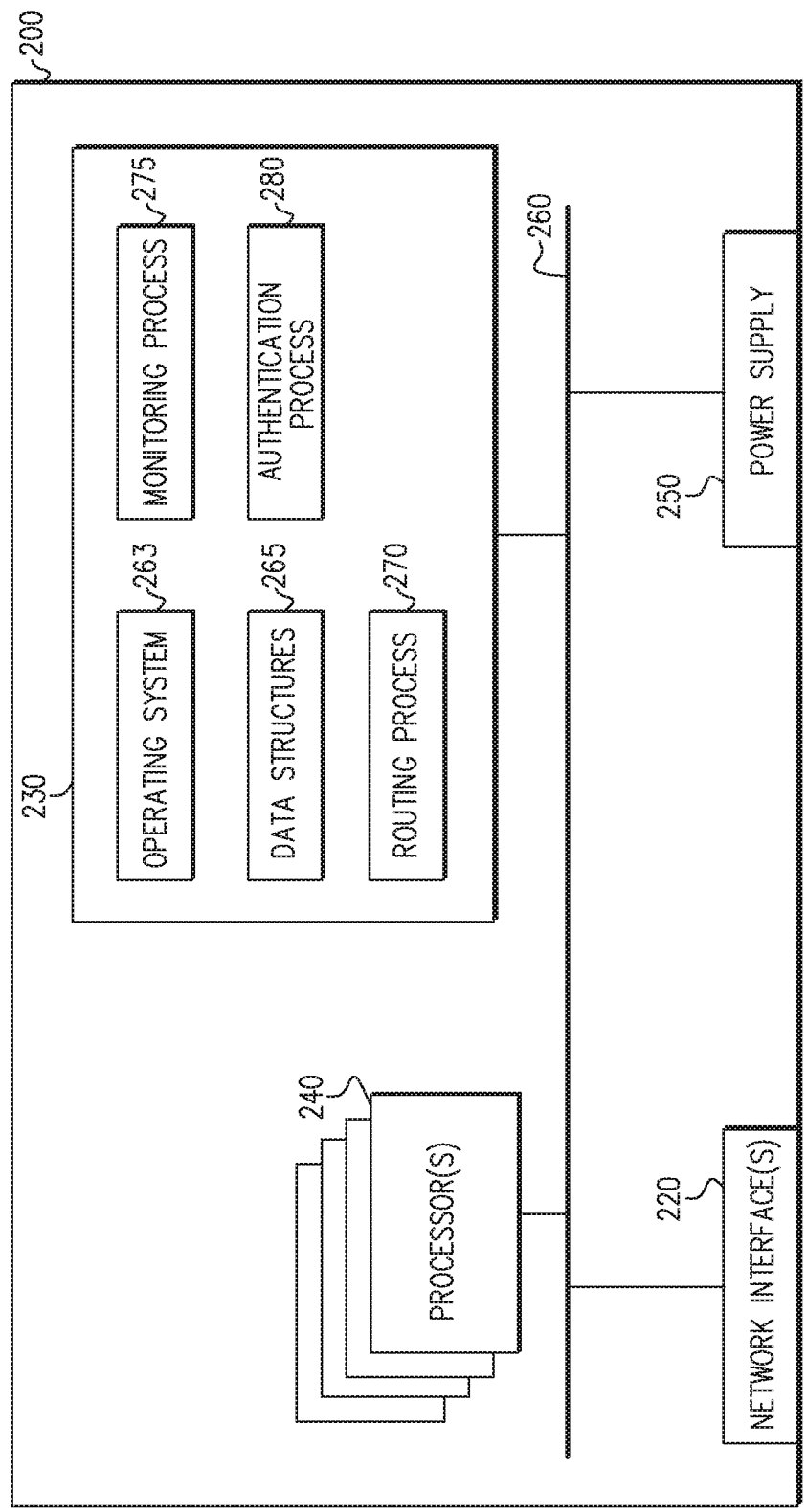
FIG. 2 is a schematic block diagram of a device in the network of FIG. 1.

Reference is now made to FIG. 2, which is a schematic block diagram of a device 200, such as device 110 and/or 120A-120F, in the network of FIG. 1. The device 200 may comprise one or more network interfaces 220, a memory 230, at least one processor 240, as well as a power supply 250 (e.g., battery, plug-in, etc.), interconnected by a system bus 260.

The device 200 might be an Internet-of-Things (IoT) device, for example, a physical device, a vehicle, a consumer device or appliance, or other item which comprises embedded electronics, software, sensors, actuators, network connectivity, and so forth. Alternatively, the device 200 may be another sort of device which may have more computing power than an IoT device. Without limiting the generality of the foregoing, the device might be a device in a system where chaining might be useful, and in accordance with embodiments described herein, uses a chained approach to get information from other devices. In embodiments where the device has more computing power, the device depicted in FIG. 2 may typically have other components, such as storage, and possibly user interfaces, which are not depicted in FIG. 2.

The one or more network interfaces 220 comprise mechanical, electrical, and signaling circuitry for communicating data over links coupled to a network (not depicted). The one or more network interfaces 220 may be configured to transmit and/or receive data using a variety of different communication protocols, particularly shared-media protocols (e.g., wireless, power-line communication (PLC), etc.) for communication among the devices 120A-120F of FIG. 1, and optionally a wired protocol as well. That is to say, certain of the devices 120A-120F of FIG. 1 may have two or more different types of network interfaces 220, and the depiction in FIG. 2 is merely for illustration. Additionally, it is noted that although the one or more network interfaces 220 is depicted separately from the power supply 250, for PLC, the network interface 220 may communicate through the power supply 250, or may be a component of the power supply 250.

The memory 230 comprises a plurality of storage locations that are addressable by the at least one processor 240, and the one or more network interfaces 220 for storing software programs and data structures 265 associated with the embodiments described herein. It is appreciated that some devices among the devices 120A-120F of FIG. 1 may have limited memory or no memory (e.g., no memory for storage other than for programs/processes operating on the device and associated caches). The processor 240 may comprise elements or logic adapted to execute software programs and manipulate data structures 265. An operating system 263, portions of which are typically resident in memory 230 and executed by the at least one processor 240, functionally organizes the device 200 by, inter alia, invoking operations in support of software processes and/or services executing on the device 200. These software processes and/or services on the devices 120A-120F of FIG. 1 may comprise other processes, some of which are depicted in FIG. 2 by way of example, namely a routing process 270, a monitoring process 275 and an authentication process 280. Other processes, not explicitly depicted in FIG. 2, may also be resident in memory 230, and may include other applications which are operating on the device 200. Note that while some processes, such as, but not limited to, the monitoring process 275 and the authentication process 280, are depicted in the memory 230, in alternative embodiments, such processes may be operated, for example, in the one or more network interfaces 220.

By way of example, the routing process 270 might be involved in the formulation of the SRv6 segment list 150 of FIG. 1. The at least one processor 240 might formulate the iOAM request 170A-170F or response 180A-180F, which is then included in the packet 160, which is received and/or sent to a further destination by the network interface 220.

Persons of skill in the art will appreciate that other processor and memory types, including various computer-readable media, may be used to store and execute program instructions pertaining to the embodiments described herein. Also, while the present disclosure illustrates various processes, it is expressly contemplated that various processes may be embodied as modules configured to operate in accordance with the embodiments disclosed herein (e.g., according to the functionality of a similar process). Further, while the processes have been shown separately, those skilled in the art will appreciate that certain processes may be implemented as routines or modules within other processes.

One of the at least one processor 240 may be a special purpose processor operative to perform the methods described herein above. The at least one processor 240 comprises dedicated hardware logic circuits, in the form of an application-specific integrated circuit (ASIC), field programmable gate array (FPGA), or full-custom integrated circuit, or a combination of such devices. Alternatively or additionally, at least some of the functions of the at least one processor 240 may be carried out by a programmable processor microprocessor or digital signal processor (DSP), under the control of suitable software. This software may be downloaded to the processor in electronic form, over a network, for example.

The memory 230 may comprise memory modules such as a Random Access Memory (RAM), where machine readable instructions may reside during runtime, and a secondary memory. The secondary memory may include flash drive, etc., or a nonvolatile memory where a copy of machine readable instructions or software may be stored. The secondary memory may also include ROM (read only memory), EPROM (erasable, programmable ROM), EEPROM (electrically erasable, programmable ROM).

It will be apparent to one of ordinary skill in the art that one or more of the components of the exemplary device 200 may not be included and/or other components may be added as is known in the art. The exemplary device 200 shown in FIG. 2 is provided as an example of a possible platform that may be used, and other types of platforms may be used as is known in the art.

The methods described herein above might be implemented by a client in a distributed fashion, as described above. Alternatively, a dedicated client (not depicted) which implements the methods described herein above might be resident in the memory 230.

In a first embodiment, pre-existing definitions of iOAM headers and SRv6 headers are used as detailed below in Table 1. The fields are as specified in various RFCs and Internet drafts. iOAM headers are specified, at least, in an Internet Draft, draft-brockners-ioam-vxlan-gpe-00, of Brockners, F., et al., "Encapsulation for In-situ OAM Data", 30 Oct. 2017. SRv6 headers are specified, at least, in an Internet Draft entitled "IPv6 Segment Routing Header (SRH)". Some brief explanations of these fields are provided below with reference to Table 2.

The initial two rows of Table 1 provide a bit length index for fields in the headers.

Table 2, below, provides an explanation of the fields mentioned in Table 1 (and Table 3, below).

TABLE 2

| Protocol | Field | Details |
| --- | --- | --- |
| Ethernet | Ethernet Header | For Layer 2 communications. |
| IPv6 | IPv6 Header | For Layers 3 and 4 communications. |
| iOAM | Type | Indicate that following fields are populated according to the iOAM protocol. |
| iOAM | OAM HDR len | Length of the OAM header. |
| iOAM | Reserved | An 8-bit reserved field which is set to zero. |
| iOAM | Next Protocol | Specifies which a type of header which follows the iOAM header. |
| iOAM | iOAM Options | Field where the iOAM Requests 170A-F (FIG. 1) and Responses 180A-D (FIG. 1) are recorded. |
| SRv6 | Next Header | Specifies which a type of header which follows the SRv6 header. |
| SRv6 | Hdr Ext Len | Length of the SRv6 header. |
| SRv6 | Routing Type | (not specified at this time). |
| SRv6 | Segments Left | An index value, [n], of the next segment to inspect. Decremented at each segment. |
| SRv6 | First Segment | Index, [n], in the segment list, of the first segment of the path to be followed. |
| SRv6 | Flags | Flags as specified in the SRv6 protocol. |
| SRv6 | HMAC Key ID | Identification information pertaining to a key used to calculate a keyed hash message authentication code (HMAC) for the header. The HMAC might be calculated, for example, by the authentication process 280. |
| SRv6 | Segment List [n] | IPv6 addresses representing the nth segment in the Segment List. The Segment List is encoded starting from the last segment of the path. I.e., the first element of the segment list (Segment List [0]) contains the last segment of the path while the last segment of the Segment List (Segment List[n]) contains the first segment of the path. |
| Upper Layer Protocols | | Higher layer protocols which follow in the packet header. |

In this embodiment, the packet header is built based on standard IPv6 definitions. Thus, an iOAM "hop-by-hop" header is processed first. The SRv6 header follows the iOAM header.

The iOAM header contains a set of bulk (or individual) requests (i.e., Requests A-F 170A-170F, FIG. 1) for a set of devices (i.e., 120A-120F, FIG. 1). These devices 120A-120F (FIG. 1) are addressed within the SRv6 header portion of the packet header. For devices 120A-120F (FIG. 1), the col-

TABLE 1

| 0 | | | | | | | | | | 1 | | | | | | | | | | 2 | | | | | | | | | | 3 | |
| --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- |
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Ethernet Header | | | | | | | | | | | | | | | | | | | | | | | | | | | | | | | |
| IPv6 Header | | | | | | | | | | | | | | | | | | | | | | | | | | | | | | | |
| Type = iOAM | | | | | | | | | OAM HDR len | | | | | | | | | | Reserved | | | | | | | | | | Next Protocol | | |
| iOAM Options | | | | | | | | | | | | | | | | | | | | | | | | | | | | | | | |
| Next Header | | | | | | | | | Hdr Ext Len | | | | | | | | | | Routing Type | | | | | | | | | | Segments Left | | |
| First Segment | | | | | | | | | Flags | | | | | | | | | | | | | | | | | | | | HMAC Key ID | | |
| Segment List [0] (128 bits ipv6 address) | | | | | | | | | | | | | | | | | | | | | | | | | | | | | | | |
| . . . | | | | | | | | | | | | | | | | | | | | | | | | | | | | | | | |
| Segment List [n] (128 bits ipv6 address) | | | | | | | | | | | | | | | | | | | | | | | | | | | | | | | |
| Upper Layer Protocols | | | | | | | | | | | | | | | | | | | | | | | | | | | | | | | | lected information, based on the information request, is inserted into the iOAM header, i.e. Responses A-D 180DA-180D (FIG. 1). At an end of the flow, such as at server 130, the Responses A-D 180DA-180D (FIG. 1) (and further, non-depicted responses) can be decapsulated creating a chained collection of information from the set of devices.

In a second embodiment, the packet header can be a merged header structure that incorporates elements of the iOAM header into the SRv6 header. Accordingly, the iOAM element is directly specific to its associated segment defined within the SRv6 header. It is appreciated that this embodiment changes to the standardization of IPv6, iOAM and SRv6. Nevertheless, the inventors believe that such changes add advantages which are presently lacking in existing standards and protocols. The packet header structure provides a close correlation between the actual Segment ID (IPv6 address), the device request information and the device information collected. Such an information triad defines an information set that is defined for the device from which information is collected.

embodiments may also be provided in combination in a single embodiment. Conversely, various features of embodiments which are, for brevity, described in the context of a single embodiment may also be provided separately or in any suitable subcombination.

It will be appreciated by persons skilled in the art that embodiments described herein are not limited by what has been particularly shown and described hereinabove. Rather the scope of embodiments are defined by the appended claims and equivalents thereof:

What is claimed is:

1. A device comprising:
a processor;
a memory operative to store data used by the processor;
a network interface operative to enable network communications with at least one other device; and
a client executed by the processor, the client operative to utilize a first network metadata enabled protocol to chain a request for information from a plurality of sensors and to send an information request packet via the network interface to the at least one of the plurality of other sensors, the information request packet comprising:
the request for information from the plurality of sensors; and
a header of a second network metadata enabled protocol, in which a response to the request for information may be provided,
wherein the information, once provided, is available to be used or modified by at least one of the plurality of sensors,
wherein a first sensor of the plurality of sensors adds the requested information to the header and the request for information is forwarded to a second sensor in the plurality of sensors.

2. The device according to claim 1 wherein the first network metadata enabled protocol comprises a network services header (NSH) protocol.

3. The device according to claim 1 wherein the first network metadata enabled protocol comprises a segment routing (SR) protocol.

4. The device according to claim 1 wherein the first network metadata enabled protocol is a protocol for use in an Internet Protocol version 6 (IPv6) environment.

5. The device according to claim 1 wherein the second network metadata enabled protocol comprises an in-situ Operations, Administration, and Maintenance (iOAM) protocol.

6. The device according to claim 1 wherein the second network metadata enabled protocol header further comprises at least one request for information.

TABLE 3

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Ethernet Header ||||||||||||||||||||||||||||||||
| IPv6 Header ||||||||||||||||||||||||||||||||
| Next Header |||||||| Hdr Ext Len |||||||| Routing Type |||||||| Segments Left ||||||||
| First Segment |||||||| Flags |||||||| | | | | | | | | HMAC Key ID ||||||||
| Segment List [0] (128 bits ipv6 address) ||||||||||||||||||||||||||||||||
| Type = iOAM |||||||| OAM HDR len |||||||||||||||| Segments Left ||||||||
| iOAM Options ||||||||||||||||||||||||||||||||
| Segment List [1] (128 bits ipv6 address) ||||||||||||||||||||||||||||||||
| Type = iOAM |||||||| OAM HDR len |||||||||||||||| Segments Left ||||||||
| iOAM Options ||||||||||||||||||||||||||||||||
| Segment List [n] (128 bits ipv6 address) ||||||||||||||||||||||||||||||||
| Type = iOAM |||||||| OAM HDR len |||||||||||||||| Segments Left ||||||||
| iOAM Options ||||||||||||||||||||||||||||||||
| Upper Layer Protocols ||||||||||||||||||||||||||||||||

Figure 3:
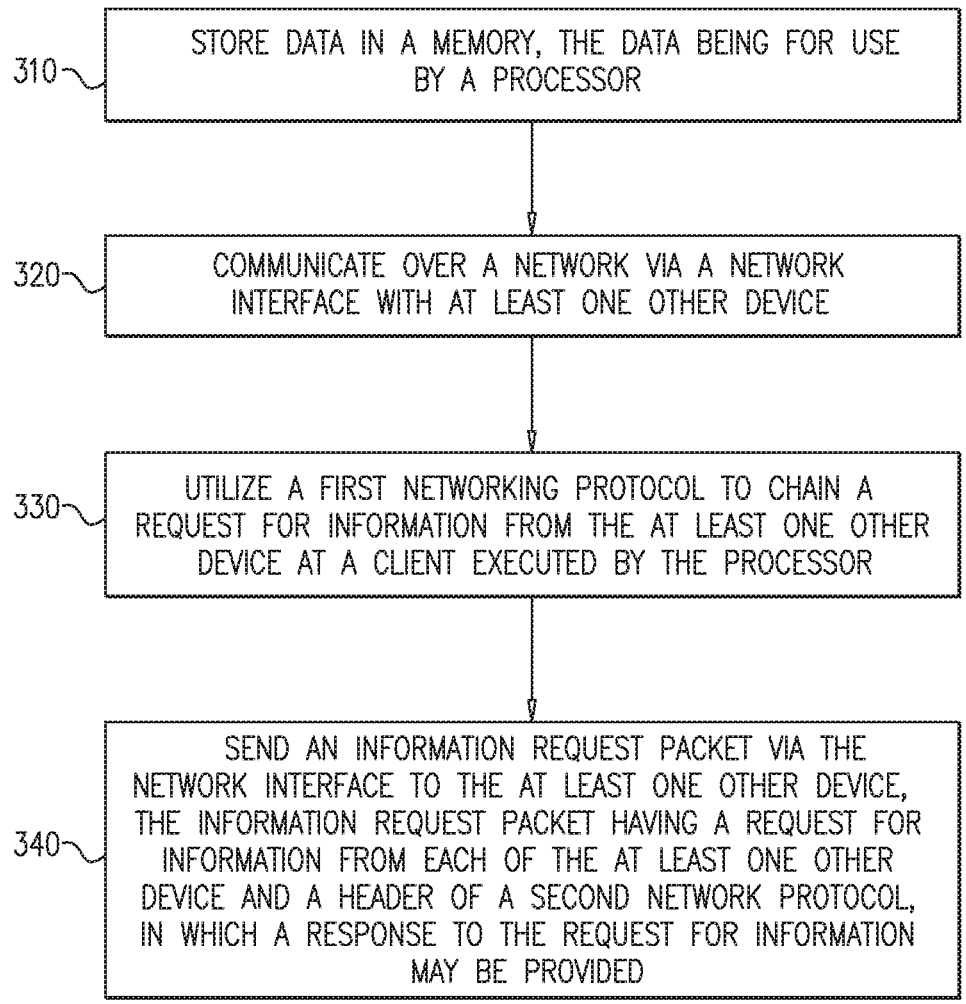
FIG. 3 is a flowchart diagram of a method of implementation of the system of FIG. 1.

Reference is now additionally made to FIG. 3, which is a flowchart diagram of a method of implementation of the system of FIG. 1. At step 310, data for use by a processor, such as the at least one processor 240, is stored in a memory, such as the memory 230. At step 320, the one or more network interfaces 220 communicate(s) over the network with at least one other device. At step 330, a first networking metadata enabled protocol (e.g., SRv6 or NSH) is utilized by a client which is executed by the at least one processor 240 in order to chain a request for information from the at least one other device. At step 340, an information request packet is sent via the one or more network interfaces 220 to the at least one other device, the information request packet having the request for information from the at least one other device and a header of a second network metadata enabled protocol, in which a response to the request for information may be provided.

It is appreciated that software components of the present disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It is appreciated that various features of embodiments which are, for clarity, described in the contexts of separate 7. The device according to claim 1 wherein the second network header precedes a header of the first network metadata enabled protocol.

8. The device according to claim 1 wherein the second network header is directly addressed to a specific segment addressed by the first network metadata enabled protocol, and is incorporated into a header of the first network metadata enabled protocol addressing the specific segment.

9. The device according to claim 1 wherein a final destination of the information request packet is a server.

10. The device according to claim 1 wherein the at least one of the plurality of other sensors is an Internet of Things (IoT) device.

11. A method comprising:
- storing data in a memory, the data being for use by a processor;
- utilizing a first network metadata enabled protocol to chain a request for information from a plurality of sensors at a client executed by the processor;
- sending the request for information via a network interface to at least one other device, the request for information:
  - requesting information from the plurality of sensors; and
  - providing a header of a second network metadata enabled protocol, in which a response to the request for information may be provided,
- wherein the information, once provided, is available to be used or modified by at least one of the plurality of sensors,
- wherein a first sensor of the plurality of sensors adds the requested information to the header and the request for information is forwarded to a second sensor in the plurality of sensors.

12. The method according to claim 11 wherein the first network metadata enabled protocol comprises a network services header (NSH) protocol.

13. The method according to claim 11 wherein the first network metadata enabled protocol comprises a segment routing (SR) protocol.

14. The method according to claim 11 wherein the first network metadata enabled protocol is a protocol for use in an Internet Protocol version 6 (IPv6) environment.

15. The method according to claim 11 wherein the second network metadata enabled protocol comprises an in-situ Operations, Administration, and Maintenance (iOAM) protocol.

16. The method according to claim 11 wherein the second network metadata enabled protocol header further comprises at least one request for information.

17. The method according to claim 11 wherein the second network header precedes a header of the first network metadata enabled protocol.

18. The method according to claim 11 wherein the second network header is directly addressed to a specific segment addressed by the first network metadata enabled protocol, and is incorporated into a header of the first network metadata enabled protocol addressing the specific segment.

19. The method according to claim 11 wherein a final destination of the request for information is a server.

20. The method according to claim 11 wherein the at least one of the plurality of sensors is an Internet of Things (IoT) device.

* * * * *